United States Patent [19]
Hang

[11] Patent Number: 5,115,309
[45] Date of Patent: May 19, 1992

[54] METHOD AND APPARATUS FOR DYNAMIC CHANNEL BANDWIDTH ALLOCATION AMONG MULTIPLE PARALLEL VIDEO CODERS

[75] Inventor: Hsueh-Ming Hang, Howell, N.J.

[73] Assignee: AT&T Bell Laboratories, Murray Hill, N.J.

[21] Appl. No.: 580,412

[22] Filed: Sep. 10, 1990

[51] Int. Cl.$^5$ .............................................. H04N 7/12
[52] U.S. Cl. ................... 358/133; 358/135; 358/136; 370/118; 370/79; 370/112
[58] Field of Search ............... 358/133, 136, 135, 426, 358/432, 433; 370/79, 80, 82, 83, 84, 110.01, 110.04, 111, 112, 118

[56] References Cited
U.S. PATENT DOCUMENTS

| | | | |
|---|---|---|---|
| 4,455,649 | 6/1984 | Esteban et al. | 370/83 |
| 4,550,399 | 10/1985 | Caron | 370/80 |
| 4,581,638 | 4/1986 | Chiariglione et al. | 358/133 |
| 4,638,476 | 1/1987 | Acampora et al. | 370/79 |
| 4,757,383 | 7/1988 | Tanaka | 398/133 |
| 4,797,944 | 1/1989 | Tanaka | 358/136 |
| 4,825,285 | 4/1989 | Speidel et al. | 358/136 |
| 4,941,042 | 7/1990 | Martens | 358/136 |
| 4,951,140 | 8/1990 | Ueno et al. | 358/136 |
| 4,957,688 | 9/1990 | De With | 358/133 |
| 4,984,076 | 1/1991 | Watanabe et al. | 358/133 |
| 5,038,209 | 8/1991 | Hang | 358/135 |

OTHER PUBLICATIONS

"Draft Revision of Recommendation H.261 Video Codec for Audiovisual Services at px64 kbit/s", Source: WP XV/1, CCITT, Study Group XV, Geneva, Jul. 16–27, 1990.
"Description of Ref. Model 8(RM8)", Source: Specialist Group on Coding for Visual Telephony, CCITT SGXV, Working Party XV/4, Document 525, 1989.
"Fixed and Adaptive Predictors for Hybrid Predictive/Transform Coding", S. Ericsson, IEEE Transactions on Communications, vol. Com-33, No. 12, Dec. 1985.
"Basic Characteristics of Variable Rate Video Coding in ATM Environment", M. Nomura, et al., IEEE Journal on Selected Areas in Communications, vol. 7, No. 5, Jun. 1989.
"Subband Coding of Images," J. W. Woods, et al., IEEE Transactions on Acoustics, Speech, and Signal Processing, vol. ASSP34(5), Oct. 1986, pp. 1278–1288.

Primary Examiner—James J. Groody
Assistant Examiner—Michael H. Lee
Attorney, Agent, or Firm—T. Stafford

[57] ABSTRACT

A dynamic channel allocation unit for specifying a bit rate for each video coder in a set of parallel video coders comprising an overall video coder is disclosed. The dynamic channel allocation unit is supplied from each individual video coder with an average from quantization step size for the previous frame and the average number of bits produced per pel. For the current image frame the dynamic channel allocation unit computes a set of channel sharing factors, i.e., the percentage of the total channel bandwidth to be allocated to a particular video coder. One channel sharing factor is computed for each individual video coder. Individual members of the set of channel sharing factors may be further refined to reflect the prior history of the channel sharing factor for their corresponding coder. Additionally, the set of estimates may be normalized to reflect the actual number of bits that can actually be produced by each individual video coder.

19 Claims, 10 Drawing Sheets

METHOD AND APPARATUS FOR DYNAMIC CHANNEL BANDWIDTH ALLOCATION AMONG MULTIPLE PARALLEL VIDEO CODERS

TECHNICAL FIELD

This invention relates to video image processing and, more particularly, to allocating channel bandwidth among multiple video coders that are processing in parallel various areas of a single image.

BACKGROUND OF THE INVENTION

High definition television (HDTV) promises to offer a wider viewing area and improved image quality when compared with today's However, an uncompressed digital HDTV channel may require transmission bandwidth up to one gigabit per second. It is therefore desirable to compress the HDTV signal in a manner such that image quality is not significantly reduced and yet the HDTV signal can be transmitted at lower speeds. One of the main difficulties in compressing HDTV signals is the relatively high computation speeds required of the digital circuitry performing the encoding processes that achieve the compression. This difficulty is exacerbated when state-of-the-art compression algorithms are employed since these algorithms obtain increased compression only through increased complexity of calculation. The increased complexity of calculation requires that more computation be performed in the available time thereby requiring each processing unit to operate faster. The requirement of performing complex computations at high speeds can significantly increase the cost of an HDTV coder.

The division of the overall computation problem into smaller tasks is proposed to solve this problem of requiring costly circuitry for achieving highly compressed HDTV signals. One such division, a piplelined system, reduces the amount of computation performed by any particular processing unit. Each processing unit performs a small portion of the overall task and passes the result to the next processing unit. However, with this arrangement, each processing unit must still perform its assigned processing task on all the pels in the HDTV image at the high speed of the original signal.

Another possible solution is to divide the HDTV image into sub-images and to process all the sub-images in parallel. Such a solution seeks to utilize slower and therefore cheaper processing circuits to accomplish the desired compression. A single encoder performs the entire compression algorithm for an individual sub-image. Only input of that portion of the original HDTV signal representing the sub-image and output of the encoded signals representing the sub-image after compression need be performed at a high speed. This input and output activity is bursty in nature since it occurs only for a short period of time relative to the transmission time of the entire uncompressed image. Actual processing of the pels contained within each sub-image by an encoder can take place at a much slower rate between the bursts of image signal input and output.

The complexity of each sub-image may vary considerably. It is desirable to allocate more bandwidth to those sub-images that are more complex since the effectiveness of compression algorithms decreases as image complexity increases. Thus, a problem with an arrangement as described above is how to specify a bit rate for each encoder so as to allocate the available bandwidth most efficiently. Predetermined bit rate assignment is inefficient because it is unable to adjust for differences in image complexity and may thereby result in variations in the quality of different areas of the image that is reconstructed from the compressed signal. Viewers' perceptions of such variations in the quality of the reconstructed image are negative. Prior attempts to dynamically allocate the available bandwidth among the various video coders required knowledge by an allocation unit of the variance of each individual sub-image. Extensive computing capacity at high speeds is required to compute the variance of a sub-image in the limited time available because the variance is a complex calculation. This requirement of high speed calculations causes dynamic allocation units that compute variances to be expensive.

SUMMARY OF THE INVENTION

The difficulties with prior dynamic allocation arrangements are overcome, in accordance with an aspect of the invention, by dynamically allocating the available bandwidth based on an indication of sub-image complexity as determined from the average quantization step size and the average number of bits produced per pel employed by each video coder for the image contained in the previous frame. In a preferred embodiment, a dynamic channel allocation unit is supplied with an average quantization step size and an average number of bits produced per pel employed by each video coder for the image contained in the previous frame. Thereafter, an initial set of estimates of the channel sharing factors, i.e., an indication of the percentage of the total channel bandwidth that is to be allocated to a particular video coder, is derived. One channel sharing factor is computed for each individual video coder. Individual members of the set of estimates may thereafter be further refined to reflect the prior history of the channel sharing factors. Additionally, the set of estimates may be normalized to reflect the actual number of bits that can actually be produced by each individual video coder. The dynamic channel allocation unit supplies as an output to each individual video coder a channel allocation factor which is the final estimated member of the estimated channel sharing factor set corresponding to that video coder. Also, control information indicating the channel sharing factors supplied to each video coder is supplied to a multiplexer that combines the resulting data streams from each individual video coder into a single combined output data stream.

BRIEF DESCRIPTION OF THE DRAWING

In the Drawing:

Shown in FIG. 1 is an exemplary system overview, in simplified block diagram format, of a video encoder employing aspects of the invention;

Figure 2:
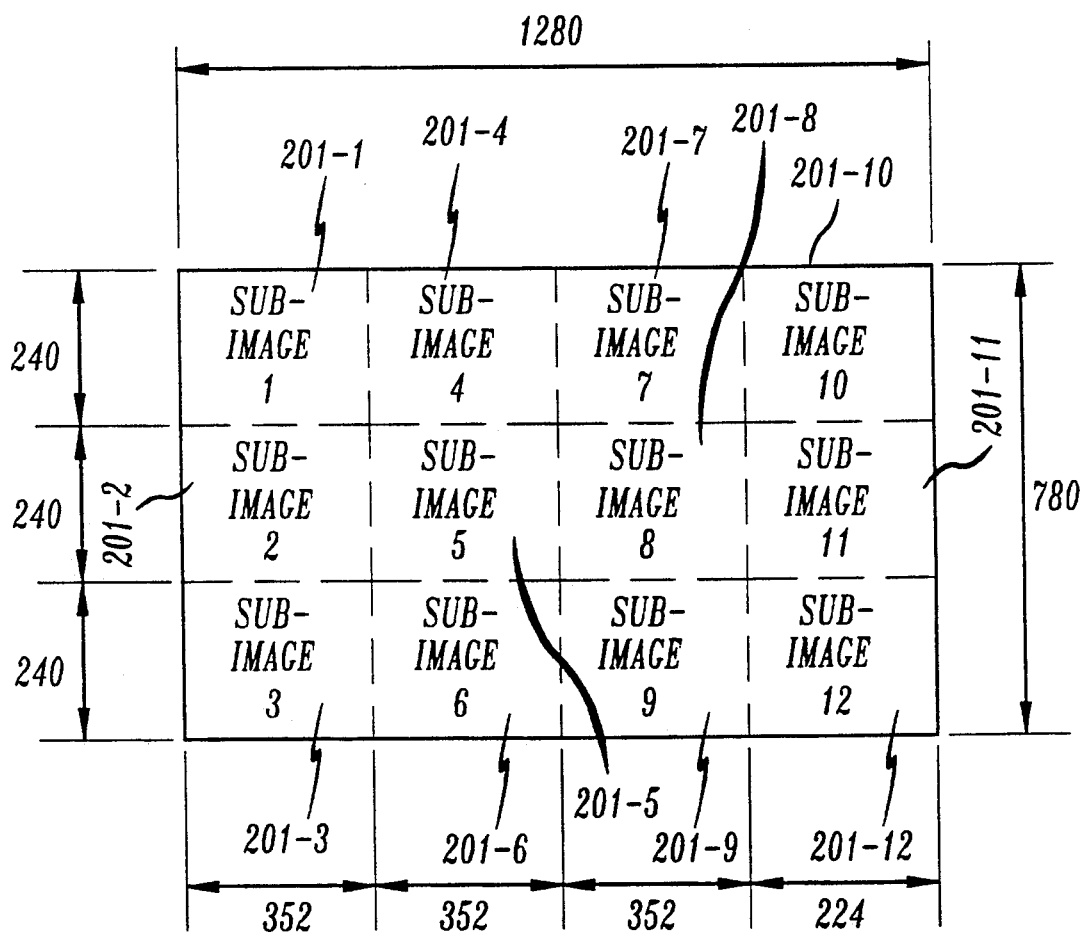
Figure 3:
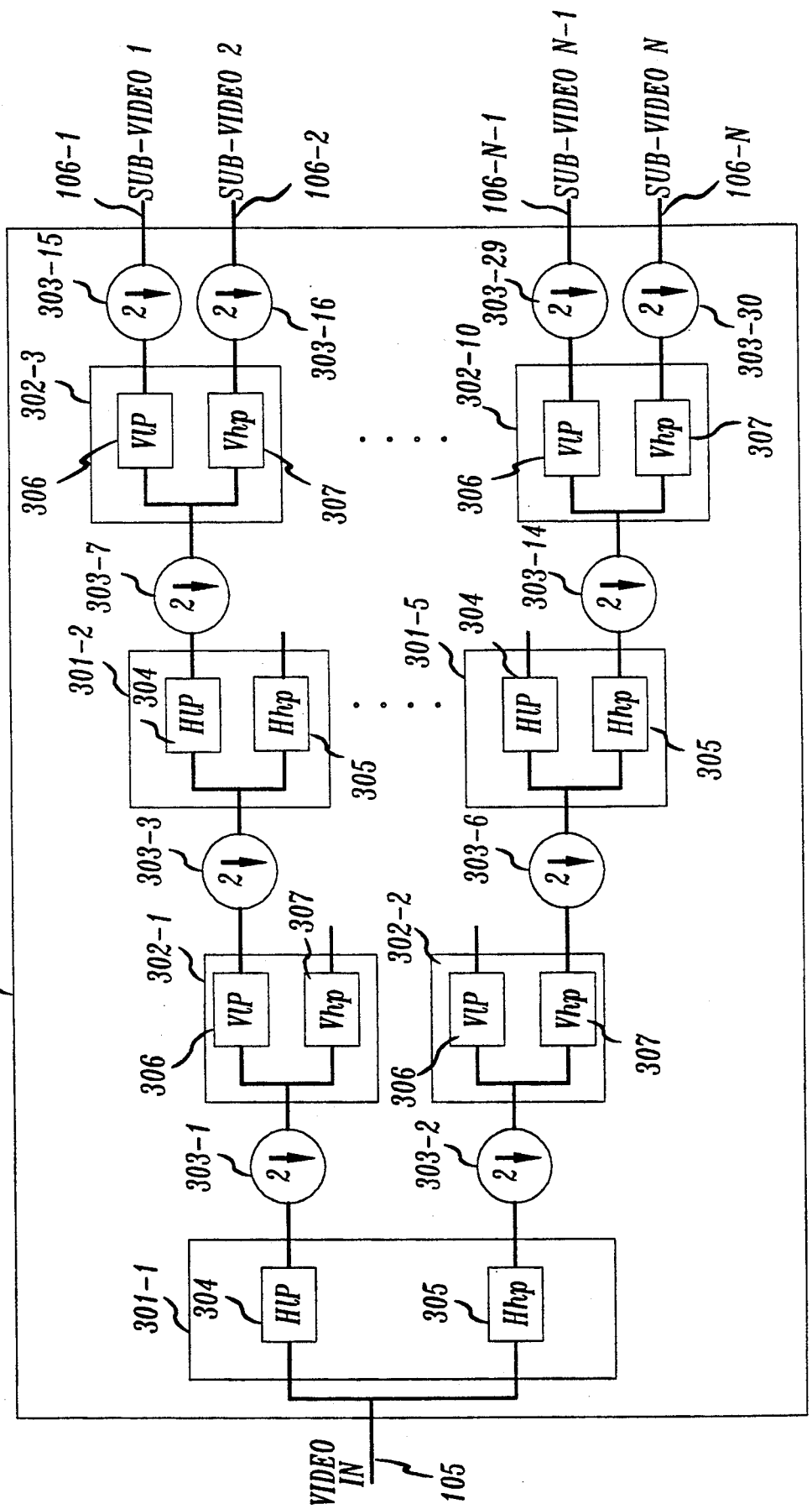
Figure 4:
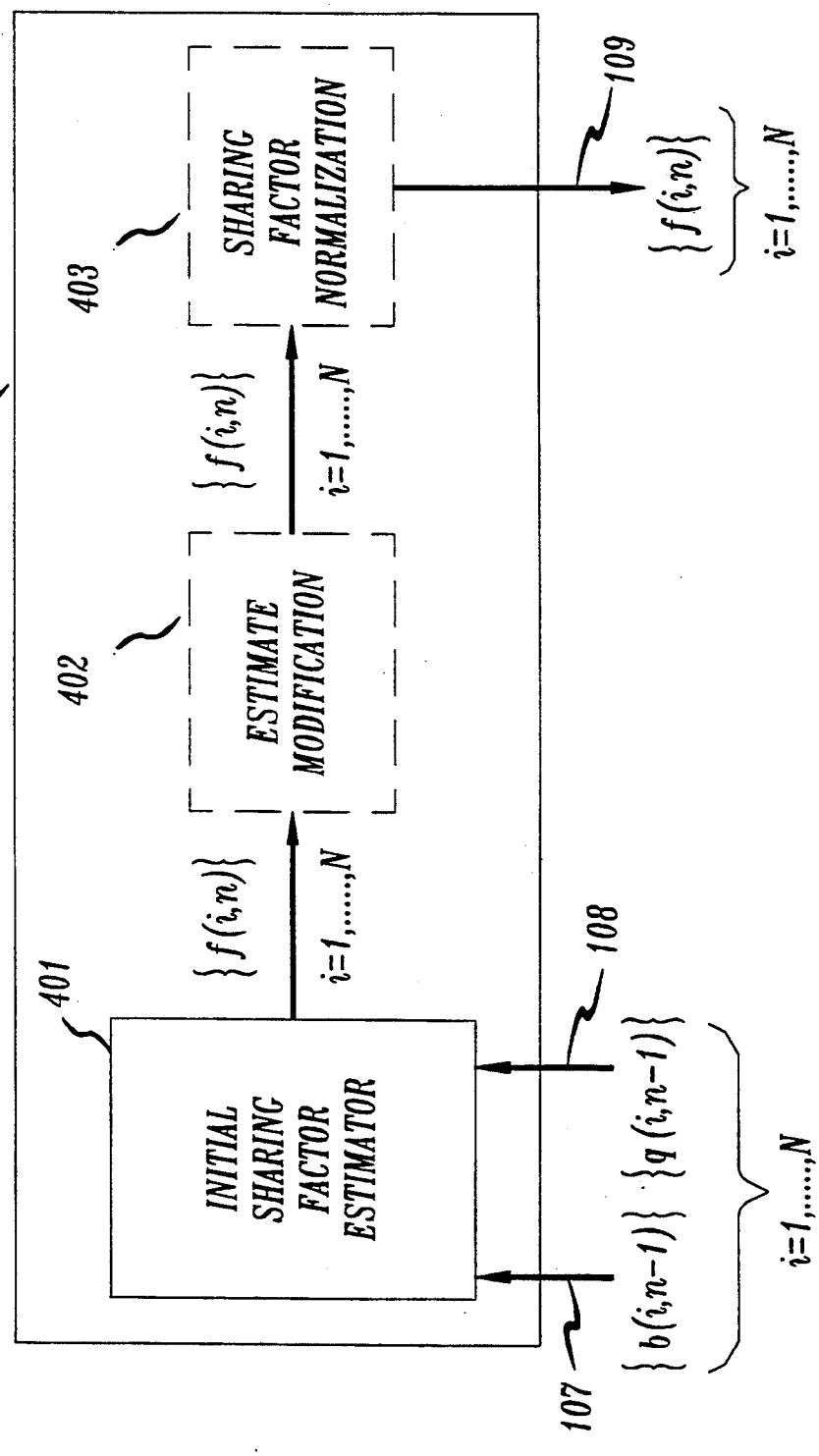
Figure 5:
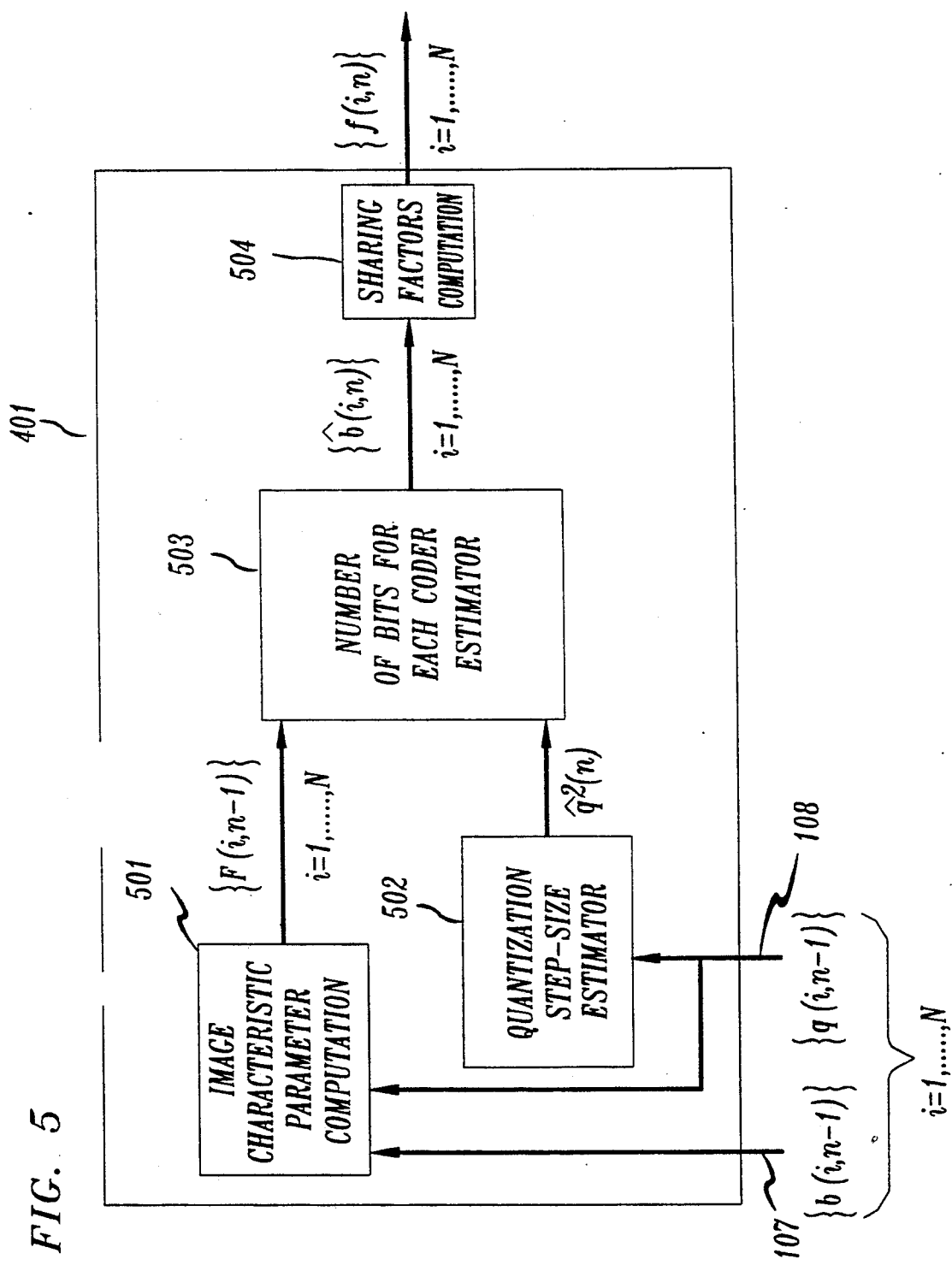

An exemplary spacial decomposition of an image is shown in FIG. 2;

FIG. 3 depicts an exemplary frequency decomposition of an image contained within an HDTV frame;

Shown in FIG. 4 is an expanded view of an exemplary implementation of a dynamic channel allocation unit;

Depicted in FIG. 5, in simplified block diagram format, is an exemplary implementation of an initial sharing factor estimator.

Figure 6:
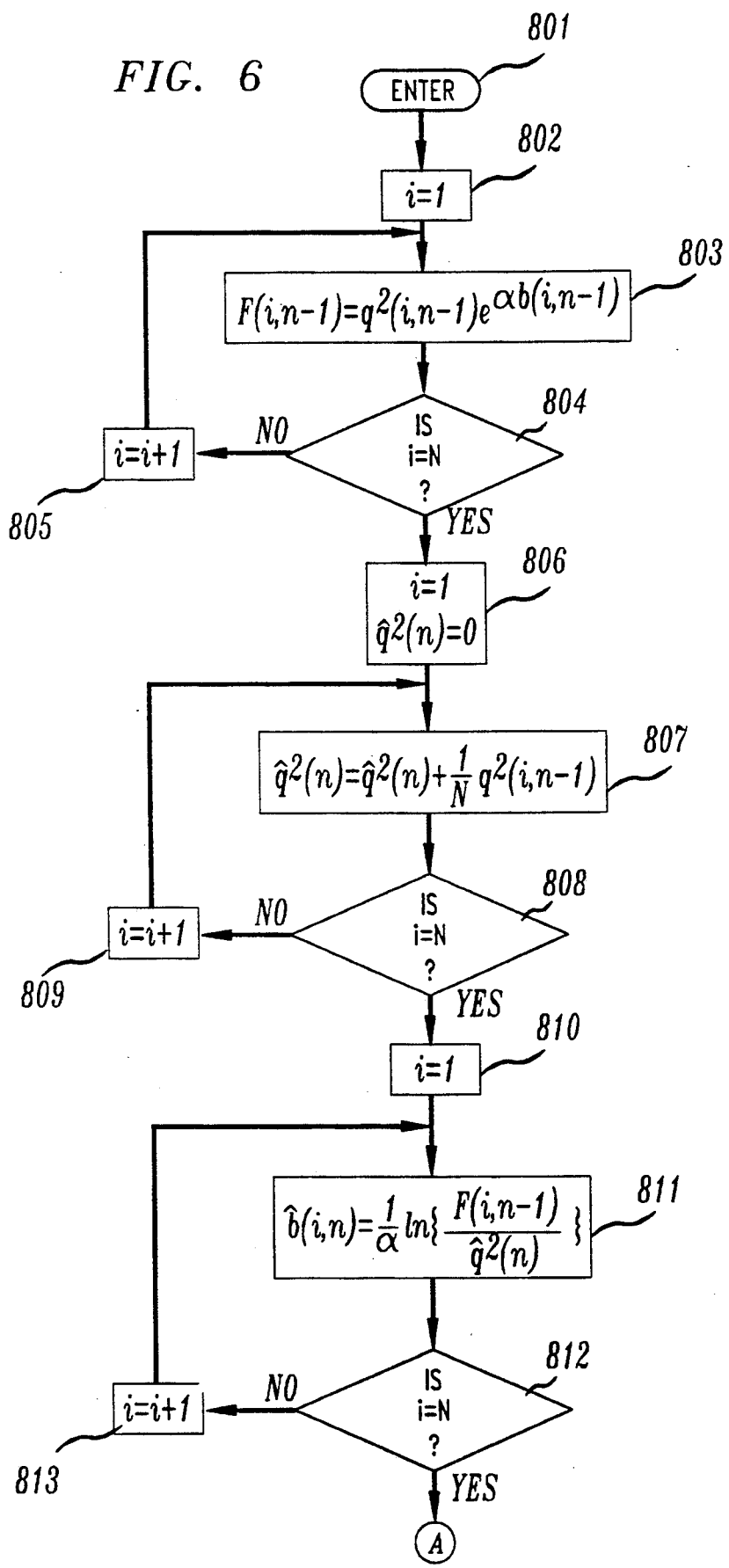
Figure 7:
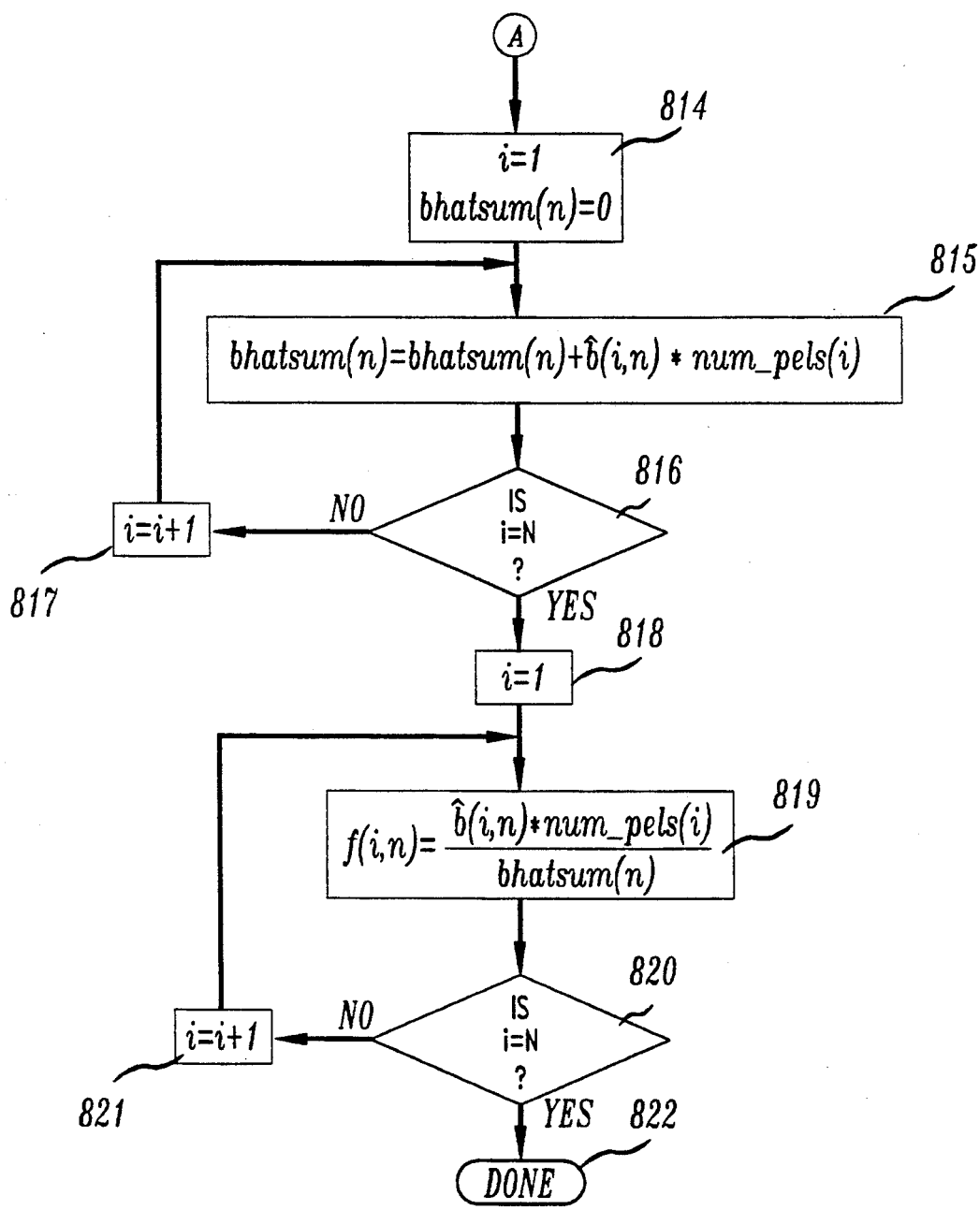
Figure 8:
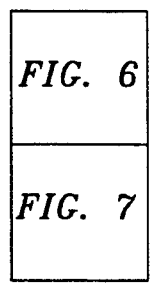
Figure 9:
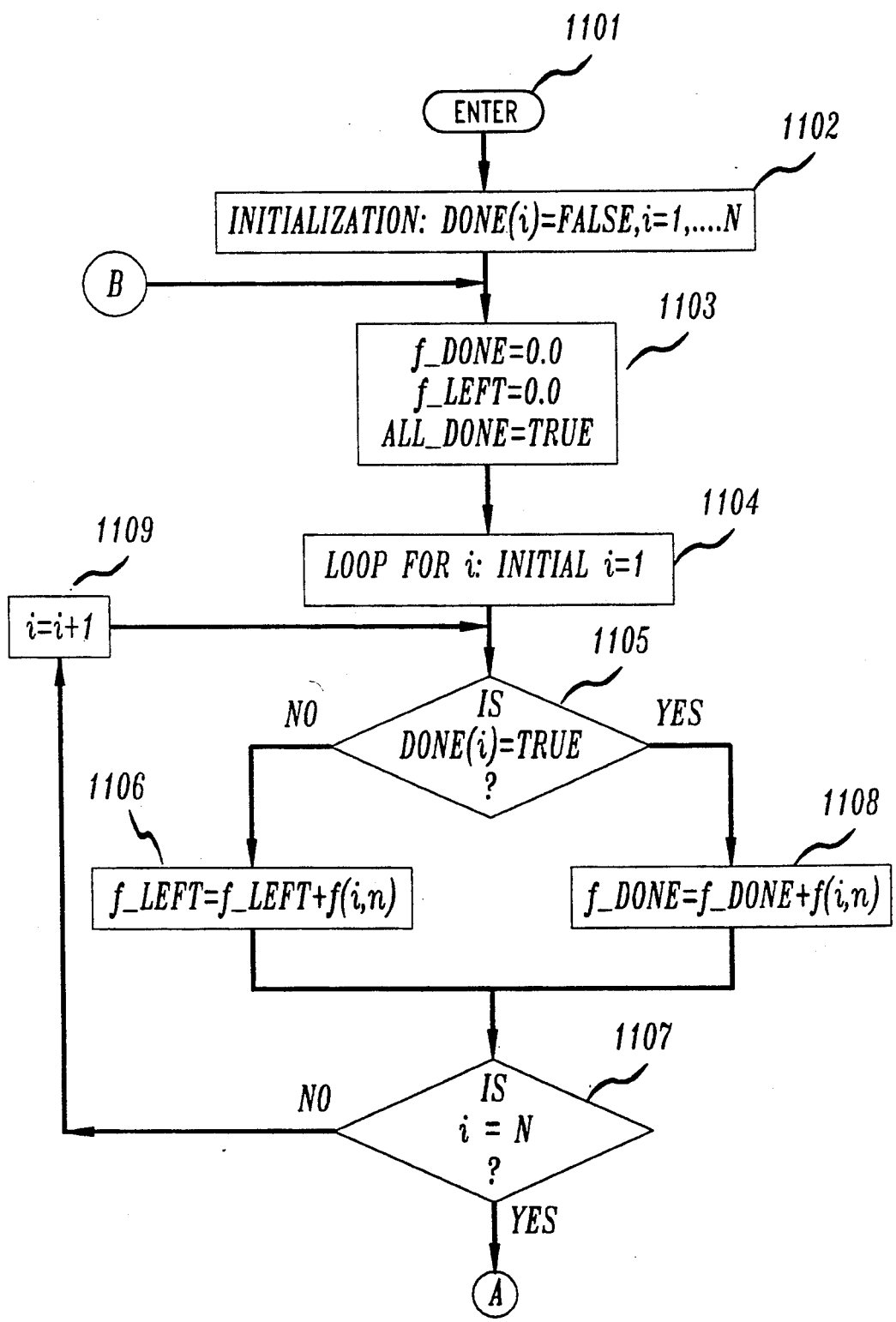
Figure 10:
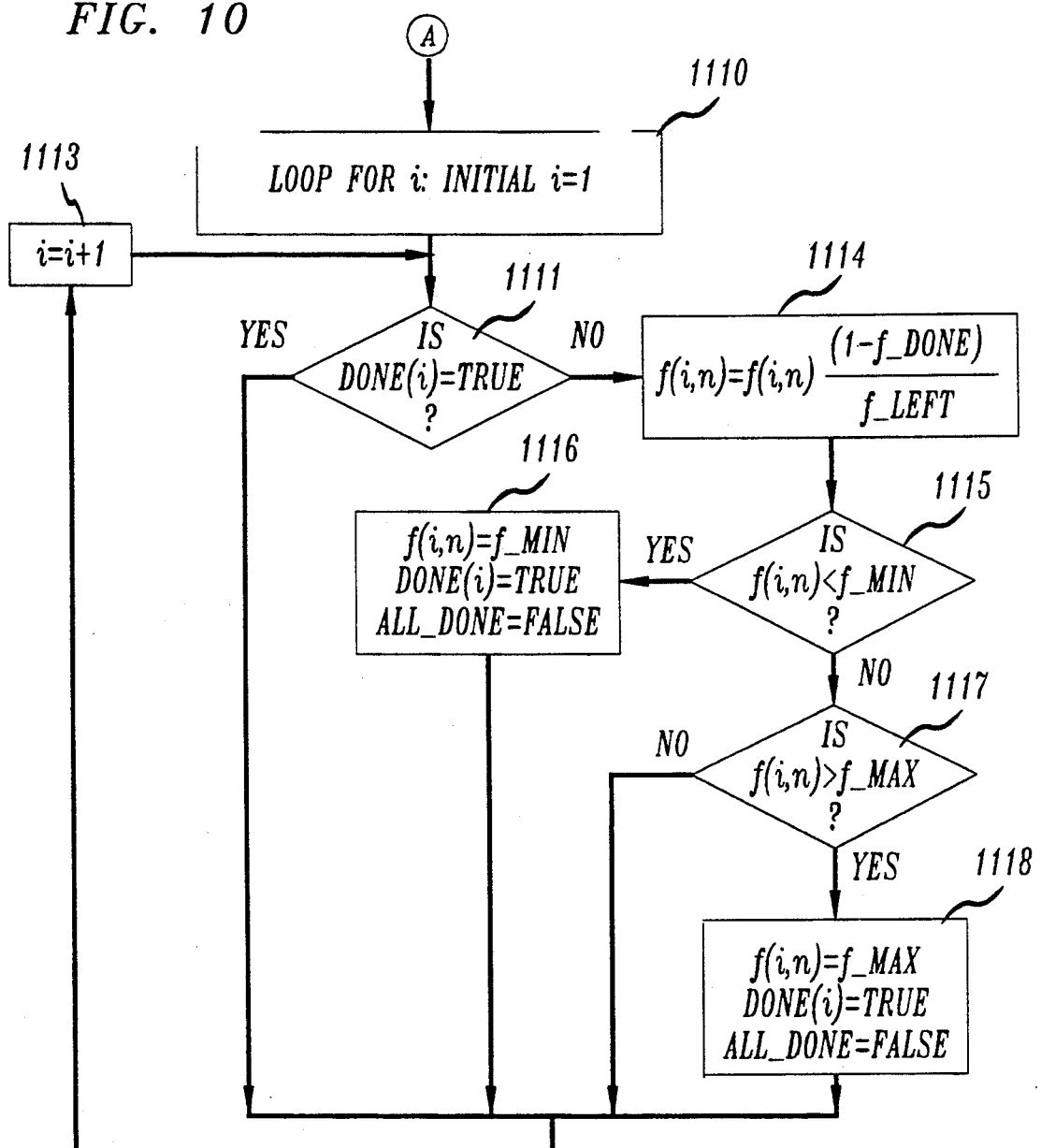
Figure 11:
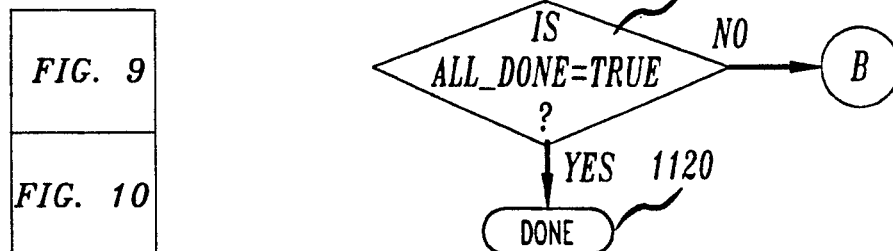
Figure 12:
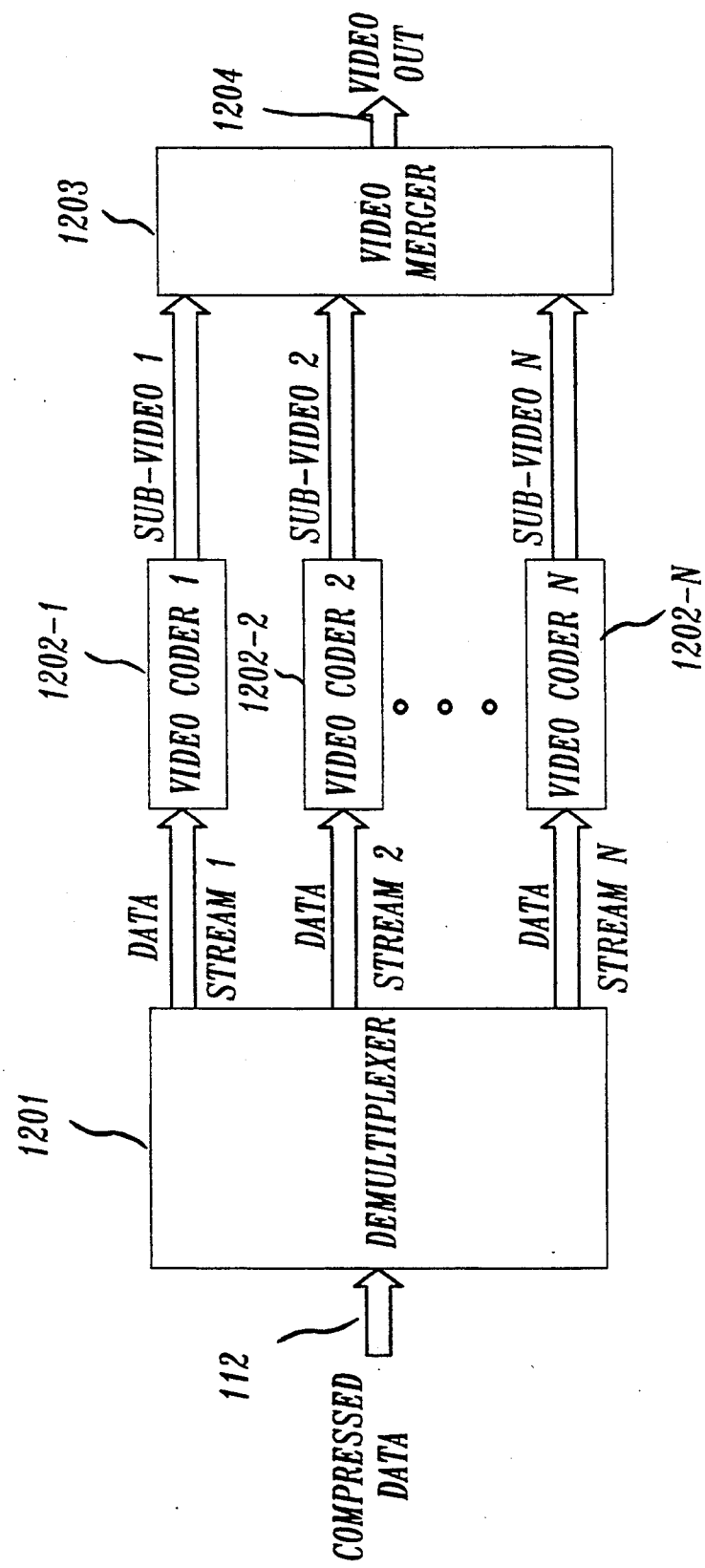

FIGS. 6 and 7, when connected as shown in FIG. 8, illustrate, in flow chart form, an exemplary method for deriving the initial set of estimated channel sharing factors by an initial sharing factor estimator;

FIGS. 9 and 10, when connected as shown in FIG. 11 form a flow chart diagram of an exemplary method of performing the normalization of a set of channel sharing factors; and Shown in FIG. 12, in a high level block diagram format, is a video decoder.

DETAILED DESCRIPTION

Figure 1:
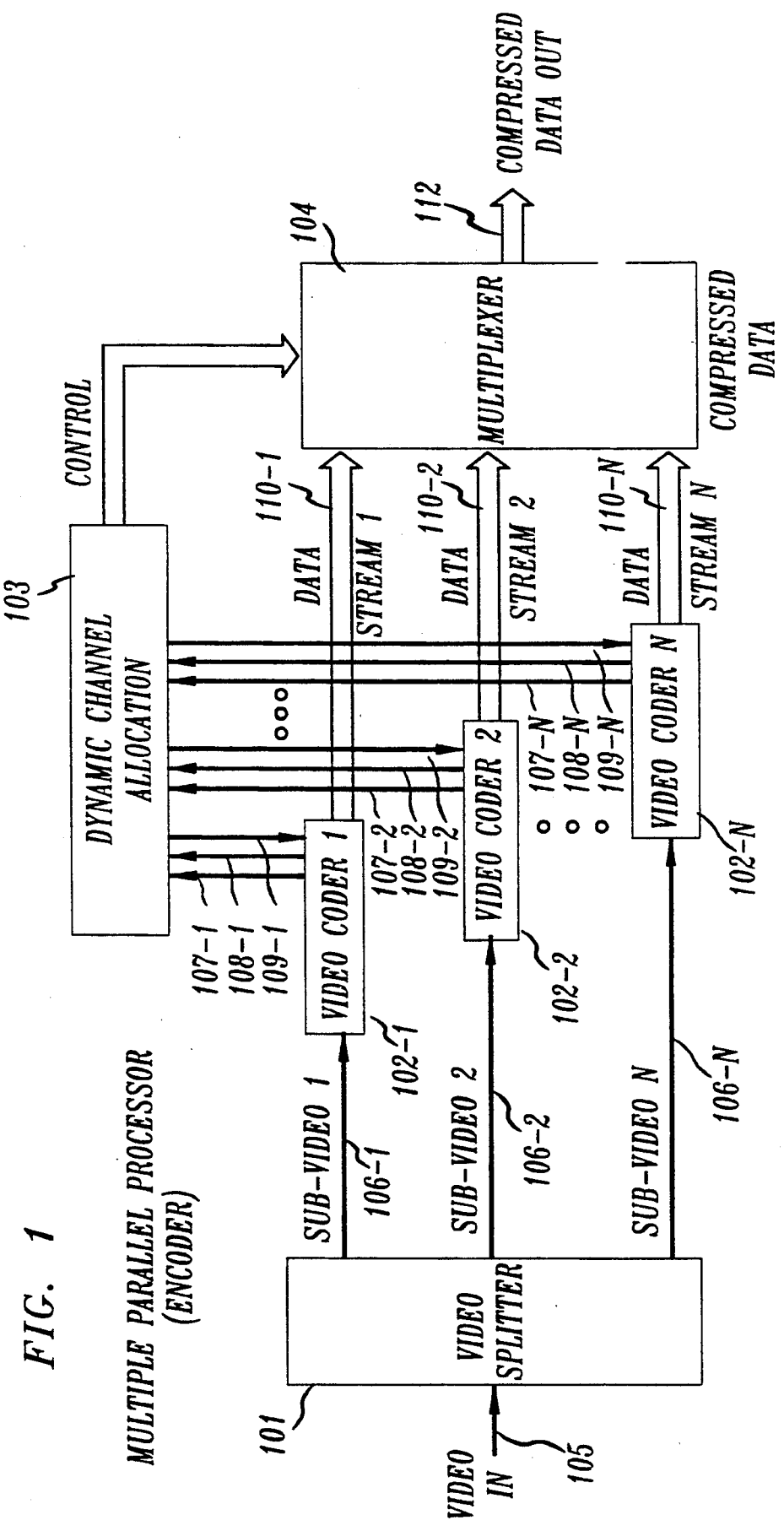

Shown in FIG. 1 is an exemplary system overview, in simplified block diagram format, of a video encoder employing aspects of the invention. The system is comprised of video splitter 101, multiple parallel video coders 102-1 through 102-N, dynamic channel allocation unit 103 and multiplexer 104. Video splitter 101 is supplied with original video signal VIDEO IN 105. Signal VIDEO IN 105 is a bit stream that comprises a series of frames each containing an image. Typically signal VIDEO IN 105 would be supplied by a well known and commercially available video signal source including, without limitation: a video camera, a videocassette recorder, or a videodisc player unit. The bandwidth of signal VIDEO IN 105 is wide. For example, the bandwidth of a video signal supplied by a video camera encoding images in the Zenith proposed HDTV format is approximately 37 Mhz.

Video splitter 101 splits each successive image of signal VIDEO IN 105 into N sub-images, each sub-image comprised of one of signals SUB-VIDEO 106-1 through SUB-VIDEO 106-N. The splitting can be achieved by employing a spatial decomposition or, alternatively, by employing a sub-band frequency decomposition. For example, each image in the Zenith HDTV format is comprised of 720 lines of 1280 pixels (pels) per line which can be spatially decomposed into an array of 12 sub-images. Therefore, N=12 and each of signals SUB-VIDEO 106 corresponds to a video signal comprising one of the 12 sub-images. An exemplary spacial decomposition of an image is shown in FIG. 2. Each resulting sub-image comprises 240 lines. Sub-images 201-1 through 201-9 have 352 pels per line and sub-images 202-10 through 202-12 have 224 pels per line. The spacial decomposition shown was selected for implementation convenience so that the resulting sub-images would be compatible in size with the Common Intermediate Format (CIF) defined in the CCITT recommendation H.261 (P×64 kbps standard). This selection should not be construed as placing any limitation on the invention.

FIG. 3 shows exemplary apparatus contained in video splitter 105 (FIG. 1) for performing an exemplary frequency decomposition of an image contained within an HDTV frame supplied from signal VIDEO IN 105. Each image is decomposed into 16 frequency bands and, therefore, N=16. The decomposition is accomplished in an exemplary manner by employing a successive series of alternating two stage filter banks, horizontal filter banks 301-1 through 301-5 and vertical filter banks 302-1 through 302-10, and sub-samplers 303-1 through 303-30 to progressively decompose each resulting filtered and sub-sampled video signal until a desired sub-image size and frequency distribution is obtained. Each horizontal filter bank 301 effects a separation in the horizontal direction of the high and low frequency components of the image contained within the video signal with which it is supplied. Similarly, each vertical filter bank 302 effects a separation in the vertical direction of the high and low frequency components of the image contained within the video signal with which it is supplied. For clarity purposes some of horizontal filter banks 301, vertical filter banks 302 and sub-samplers 303 are not shown. However, the various interconnections required will be clear to one skilled in the art. Each of horizontal filter banks 301 is comprised of horizontal low pass filter (Hlp) 304 and horizontal high pass filter (Hhp) 305. Each of vertical filter banks 302 is comprised of vertical low pass filter (Vlp) 306 and vertical high pass filter (Vhp) 307. After each filtering stage, the resulting video signals are sub-sampled by 2. The sub-sampling is performed by sub-samplers 303. Upon conclusion of the frequency band decomposition, each resulting 1/16th size sub-image (180 lines by 320 pels) is suitable to be processed by a video coder corresponding to the P×64 kbps standard. Thus, each of signal SUB-VIDEO 106 supplied as output corresponds to a video signal comprising one of the 16 sub-images. It is noted that the instant invention can be applied to any video image and no limitation should be construed by the use of HDTV as an exemplary system in which to practice the invention.

Each of signals SUB-VIDEO 106-1 (FIG. 1) through 106-N is supplied to a corresponding one of video coders 102-1 through 102-N. Video coders 102 encode their respective ones of signals SUB-VIDEO 106 and supply as an output one of DATA STREAMS 110-1 through 110-N. Each of DATA STREAMS 110 represents the sub-image contained in the corresponding one of SUB-VIDEO 106 in an encoded format. Methods of performing such encoding, e.g., conditional replenishment, motion compensated predictive coding and the P×64 kbps standard, are well know. Also encoded into DATA STREAMS 110 is any additional control information required to reconstruct, to the accuracy inherent in the coding technique employed, each of signals SUB-VIDEO 106. The number of bits desired to be supplied as an output by each of video coders 102 can be specified by control signals supplied to video coders 102. The quantization step size employed by the coder is then determined based on the number of bits desired and the complexity of the sub-image being encoded.

The set comprised of the average number of bits per pel produced by each of video coders 102 in frame $n-1$, where n is a variable indicating the current frame, is $b(i,n-1)$ for $i=1, \ldots N$,. One member of this set is supplied to dynamic channel allocation unit 103 from each of video coders 102 over signal leads 107-1 through 107-N. Similarly, the set of average quantization step size used by video coder 102-i in frame $n-1$, $q(i,n-1)$ for $i=1, \ldots N$, is also supplied to dynamic channel allocation unit 103 by video coders 102 over signal leads 108-1 through 108-N. In accordance with an aspect of the invention, dynamic channel allocation unit 103 utilizes the sets of $b(i,n-1)$ and $q(i,n-1)$ to derive a set of channel sharing factors, $f(i,n)$ for $i=1, \ldots N$, for the current frame, n, being processed by each of video coders 102. Each individual channel sharing factor, $f(i,n)$, is an indication of the fraction of the overall channel bandwidth, C, allocated to video coder 102-i for supplying to the channel the contents of its sub-image for frame n. Channel allocation unit 103 supplies the channel sharing factors $f(i,n)$ to each of video coders 102 over signal leads 109-1 through 109-N. The channel sharing factors may be in any of several formats including but not limited to: a specification of the exact number of bits each video coder 102 is to produce for the current frame; a fractional number indicating the percentage of time allocated to each coder for transmission of the bits it produces for the current frame; or a quantizer step size, either average or fixed, to be employed.

DATA STREAMS 110 are supplied to multiplexer 104. Also, the information contained in the channel sharing factors are supplied to multiplexer 104 over signal CONTROL 111. Multiplexer 104 combines each of DATA STREAMS 110 into a single signal, COMPRESSED DATA OUT 112 that is supplied as output. Also incorporated into signal COMPRESSED DATA OUT 112 is formatting information indicating how to recover each of DATA STREAMS 110. Methods of multiplexing multiple data streams are well known.

Shown in FIG. 4 is an expanded view of an exemplary implementation of dynamic channel allocation unit 103. For purposes of this example, dynamic channel allocation unit 103 comprises initial sharing factor estimator 401, optional estimate modification unit 402 and optional sharing factor normalization unit 403. In accordance with an aspect of the invention, for each current frame n, the average number of bits per pel $b(i,n-1)$ in the prior frame $n-1$ and the average quantization step size $q(i,n-1)$ for every video coder 102 is supplied to initial sharing factor estimator 401. Initial sharing factor estimator 401 supplies as output an initial set of estimated channel sharing factors, $f(i,n)$, $i=1\ldots N$.

Shown in FIG. 5, in simplified block diagram format, is exemplary implementation of initial sharing factor estimator 401 (FIG. 4). $q(i,n-1)$ is supplied from each of video coders 102 (FIG. 1) as input to image characteristic parameter computation unit 501 and quantization step size estimator unit 502 while $b(i,n)$ is also supplied as input to image characteristic parameter computation unit 501. Image characteristic parameter computation unit 501 computes for each sub-image processed by each of video coders 102 (FIG. 1) for each current frame n, an image characteristic parameter $F(i,n-1)$, for $i=1\ldots N$, indicative of the complexity of the corresponding sub-image. $F(i,n-1)$ is supplied to number of bits for each coder estimator 503. Quantization step size estimator 502 supplies a set of initial estimates of the desired quantization step size to be used for all video coders 102 for processing current frame n, $\hat{q}^2(n)$. Sharing factors computation unit 504 receives as input the set of initial estimates of the desired average bits per pel $\hat{b}(i,n)$, and supplies as an output a set of an initial set of estimated channel sharing factors, $f(i,n)$, one for each of the N video coders 102.

FIGS. 6 and 7, when connected as shown in FIG. 8, illustrate, in flow chart form, an exemplary method for deriving the initial set of estimated channel sharing factors, $f(i,n)$, $i=1\ldots N$, by initial sharing factor estimator 401 (FIG. 4). The routine is entered via step 801 after the processing of the previous frame by each of video coders 102 (FIG. 1) and their supplying of $b(i,n-1)$ and $q(i,n-1)$ to dynamic channel allocation unit 103 but prior their to processing of the current frame. When the first frame is processed the routine is not entered. This is because there was no previous frame and therefore no values are available for $b(i,n-1)$ and $q(i,n-1)$. Instead each channel is initially assigned an equal portion of the available bandwidth so that for $n=1$ $f(i,n)=1/N$. The value of index i is initialized to 1 in step 802. Thereafter, in step 803, a value for $F(i,n-1)$ is computed and stored according to $F(i,n-1)=q^{-2}(i,n-1)e^{\alpha b(i,n-1)}$. $F(i,n-1)$ is an image characteristic parameter for video coder 102-i that is determined in frame $n-1$ and $\alpha$ is a coder dependent parameter that is often a constant number, e.g. 1.39. Next, conditional branch point 804 tests if i is equal to N, i.e., has a value been computed for each video coder. If the test result in step 804 is NO, control is passed to step 805 which increments the value of i. Control is then passed back to step 803. Typically, steps 802 through 805 would be performed by image characteristic parameter computation unit 501 (FIG. 5).

If the rest result in step 804 is YES, control is passed to step 806 which resets the value of i to 1 and sets $\hat{q}^2(n)=0$. $\hat{q}^2(n)$ represents the average of the squares of the average quantizer values supplied from each of video coders 102. It is used as an estimate of the quantization step size to be used by all video coders 102 (FIG. 1) for frame n. Step 807 thereafter computes $\hat{q}^2(n) = \hat{q}^2(n) + (1/N)q^2(i,n-1)$. Next, conditional branch point 808 tests if i is equal to N. If the test result in step 808 is NO, control is passed to step 809 which increments the value of i. Control is then passed back to step 807. It is noted that there in no dependent relationships in the loop comprising steps 802 through 805 and the loop comprising steps 806 through 809. These loops may therefore be performed in any order or in parallel, at the discretion of the implementor. Typically steps 806 through 809 are performed by quantization step size estimator 502 (FIG. 5).

If the test result in step 808 is YES, control is passed to step 810 which resets the value of i to 1. Thereafter, in step 811, an estimate of the average number of bits per pixel for each coder to be employed for current frame n in which $\hat{q}^2(n)$ is used as the quantization step size, is computed according to $$\hat{b}(i,n) = \frac{1}{\alpha} \ln\left(\frac{F(i,n-1)}{\hat{q}^2(n)}\right).$$

Next, conditional branch point 812 tests if i is equal to N. If the test result in step 812 is NO, control is passed to step 813 which increments the value of i. Control is then passed back to step 811. Steps 810 through 813 would typically be executed by number of bits for each coder estimator 503 (FIG. 5).

If the test result in step 812 is YES, control is passed to a loop comprising steps 814 through 817 which calculates and stores in a temporary summing variable bhatsum(n) a total of the estimated number of bits in frame n. The number of bits estimated to be used for each sub-image is derived by obtaining the product of the average number of bits per pel estimated for video coder 102-i, $\hat{b}(i,n)$, and the number of pels in each sub-image num_pels(i). Step 814 resets the value of i to 1 and sets the value of bhatsum(n) to zero (0). Next, in step 815 the value of current value of $\hat{b}(i,n)$ is multiplied by the number of pels in signal SUB-VIDEO 106-i, num_pels(i), and added to the current value of bhatsum(n) to produce an new value of bhatsum(n). Thereafter, conditional branch point 816 tests if i is equal to N. If the test result in step 816 is NO, control is passed to step 817 which increments the value of i. Control is then passed back to step 815.

If the test result in step 816 is YES, control is passed to step 818 which resets the value of i to 1. Next step 819 computes an initial estimate of the channel sharing factor for each coder i for frame n, $f(i,n)$, according to $$f(i,n) = \frac{b(i,n) * num\_pels(i)}{bhatsum(n)}.$$

Conditional branch point 820 then tests if i is equal to N. If the test result in step 820 is NO, control is passed to step 821 which increments the value of i. Control is then passed back to step 819. If the test result in step 820 is YES, the routine is exited via step 822. The estimated channel sharing factors are available to be supplied as output f(i,n) from initial sharing factor estimator 401. Steps 814 through 822 would typically be performed by sharing factors computation unit 504 (FIG. 5).

Optional estimate modification unit 402 (FIG. 4) receives as input the estimated channel sharing factors from initial sharing estimator 401. Optional estimate modification unit 402 modifies the estimated channel sharing factors to reflect the prior history of the complexity of each sub-image, in accordance with an aspect of the invention. An exemplary way to incorporate the prior history of each sub-image is to use a weighted average of the actually employed channel sharing factors for the prior k frames and the estimated channel sharing factor for the current frame. One such embodiment employs a set of weighting factors ω(k) and computes for each video coder 102 (FIG. 1) f(i,n)=ω(o)f-(i,n)+ω(1)f(i,n−1)+... +ω(k)f(i,n−k). The number of frames, k, and the values of each of the ω(k) is determined by the implementor. For example, k=1 and ω(0)=0.7 and ω(1)=0.3. The modified estimated channel sharing factors f(i,n) are supplied as output f(i,n) by estimate modification unit 402. An advantage of employing optional estimate modification unit 402 is that a smoother change of the channel sharing factors can be achieved as compared to when initial sharing estimator 401 is employed alone.

Although the channel sharing factors f(i,n) supplied by initial sharing estimator 401 or optional estimate modification unit 402 may be employed directly, it may be desirable to normalize the channel sharing factors by employing optional sharing factor normalization unit 403. This is desirable because video coders 102 (FIG. 1) may not work at rates higher than a certain limit. Therefore, an upper limit on each channel sharing factor, f_MAX is employed. Further, image dependent parameter F(i,n−1) may have a sudden change during a scene change. To insure the provision of a minimum channel bandwidth for each of video coders 102, a lower limit on each channel sharing factor, f_MIN is employed to help reduce buffer overflow during scene change conditions. Reserving a minimum channel bandwidth for each of video coders 102 can also reduce distortion effects that can arise for coders operated at very low bit rates. In accordance with an aspect of the invention, the modified set of channel sharing factors is supplied as input to sharing factor normalization unit 403 which normalizes the set such that no individual channel sharing factor exceeds f_MAX nor are any individual channel sharing factors less than f_MIN. This normalization is performed while maintaining the spirit of the original bandwidth allocation reflected in the supplied set of channel sharing factors.

FIGS. 9 and 10, when connected as shown in FIG. 11 form a flow chart diagram of an exemplary method of performing such a normalization. For purposes of this method, each supplied channel sharing factor, f(i,n) is a fractional number indicating the fraction of the total available bandwidth C that has been allocated to video coder 102-i. Accordingly, the routine is entered via step 1101 upon the reception of a set of channel sharing factors to be normalized. In step 1102 each value of a temporary array, DONE(N) is initialized to FALSE. Thereafter, in step 1103 temporary variables f_DONE and f_LEFT are set to 0.0 while ALL_DONE is set to TRUE. f_DONE represents that portion of the total bandwidth for which the channel sharing factor has previously been permanently modified by the normalization routine. Such sharing factors have their corresponding DONE(i) value set equal to TRUE. Conversely, f_LEFT indicates the portion of the total bandwidth for which the channel sharing factor has not previously been permanently modified by the normalization routine and for which DONE(i) is FALSE. A loop for index i is begun in step 1104 in which i is initialized to one. Conditional branch point 1105 tests if DONE(i) is equal to TRUE. If the test result in step 1105 is NO, as it is for each value of i for the first iteration through this loop, control is passed to step 1106 which adds the channel sharing factor, f(i,n) to a running total of f_LEFT. Control is then passed to conditional branch point 1107. If the test result in step 1105 is YES, control is passed to step 1108 which adds the channel sharing factor, f(i,n) to a running total of f_DONE. Control is then passed to conditional branch point 1107.

Conditional branch point 1107 tests if i is equal to N, i.e., have all channel sharing factors been processed through the loop. If the test result in step 1107 is NO control is passed to step 1109 which increments i. Control is then passed back to conditional branch point 1105 and the loop is repeated.

If the test results in step 1107 is YES, control is passed to step 1110 which resets i for use in another loop. Thereafter, conditional branch point 1111 tests if DONE(i) is equal to TRUE. If the test result in step 1111 is YES, control is passed to conditional branch point 1112 which tests if i is equal to N, i.e., has each channel sharing factor been processed within this loop. If the test result in step 1112 is NO, control is passed to step 1113 which increments i and control is passed back to conditional branch point 1111.

If the test result in step 1111 is NO, control is passed to step 1114 which scales f(i,n) according to the ratio of (1-f_DONE) to f_LEFT. The first time through this loop initiated by step 1110, f_DONE is zero (0) and f_LEFT is unity so that f(i,n) remains unchanged. If, however, there are subsequent passes through this loop, at least one channel sharing factor was modified because it was either was greater than f_MAX or less than f_MIN. Thus, the total bandwidth irrevocably assigned, f_DONE, and the remaining bandwidth tentatively assigned, f_LEFT, may not equal the total available bandwidth. Therefore, appropriate scaling of the channel sharing factors that can still be modified must be performed so as to maintain the appropriate proportions of the channel sharing factors to each other as well as to assure that exactly the entire bandwidth is assigned.

Conditional branch point 1115 tests if the current value of f(i,n) is less than f_MIN, i.e., does the channel sharing factor reflect an assignment of less than the minimum allowed bandwidth. If the test result in step 1115 is YES control is passed to step 1116 which sets f(i,n) for the current i equal to f_MIN, and sets DONE(i) to true indicating that the channel sharing factor for this channel has been reset to within the permissible limits and that this channel allocation factor can not be further modified by this routine. Additionally, ALL_DONE is set to false so that the loop initiated by step 1110 will be repeated. It is necessary to repeat the loop to assure that proper scaling by step 1114 will be performed based on the remaining and fixedly assigned bandwidth. Control is then passed to conditional branch 1112 as above. If the test result in step 1115 is NO, control is passed to step 1117 which tests if f(i,n) is greater than f_MAX. An assignment of a channel sharing factor greater than f_MAX would indicate that more bandwidth has been allocated to sub-image i than an equitable and desirable allocation would permit. If the test result in step 1117 is NO, control is passed to conditional branch 1112 as described above. If the test result in step 1117 is YES, control is passed to step 1118 which sets f(i,n) equal to f_MAX. Setting f(i,n) to f_MAX sets the channel allocation factor to the maximum permissible value. Additionally, DONE(i) is set to TRUE to indicate that the channel sharing factor for this channel has been reset to within the permissible limits. Also, ALL_DONE is set to false so as to insure that the loop initiated by step 1110 will be repeated. Control is then passed to conditional branch 1112 as described above.

If the test result in step 1112 is YES, control is passed to conditional branch point 1119 which tests if the value of ALL_DONE is equal to TRUE. If the test result in step 1119 is YES, the routine is exited via step 1120. The channel sharing factors are available to be supplied as output by sharing factor normalization unit 403 (FIG. 4). If the test result in step 1119 is NO, control is passed back to step 1103 which reinitializes the temporary variables and repeats the above described loops.

By employing an array of values of f_MIN(i) and f_MAX(i) in place of the simpler f_MIN and f_MAX a more detailed assignment of bandwidth can be achieved. Such a technique could be useful for images that are decomposed by frequency because the lower frequency images typically contain most of the information content of the image. By allocating corresponding values of f_MIN(i) and f_MAX(i) based on frequency band, a more appropriate division of the available bandwidth can be obtained.

Shown in FIG. 12 in a high level block diagram format is a video decoder capable of receiving the encoded and compressed data supplied by multiplexer 104 (FIG. 1) and reconstituting a representation of original VIDEO IN signal 105. Compressed data 112 (FIG. 1) is supplied from a channel to demultiplexer 1201 which separates and reconstructs N data streams representing N sub-images. The N data streams are supplied to video coders 1202-1 through 1202-N which perform the inverse video coding of video coders 102. The resulting sub-video signals are supplied to video merger unit 1203 which recombines the sub-video signals into a single video signal in a manner consistent with the inverse of the operations performed by video splitter 101. The resulting signal, VIDEO OUT is supplied as output on signal lead 1204.

It is noted that the above described bandwidth allocation scheme could be employed if each video coder was processing image streams derived from separate video sources rather than a sub-image of an original image. In one such a situation video splitter 101 (FIG. 1) and video merger 1201 (FIG. 12) would not be employed. Instead, each signal SUB-VIDEO 106 would be supplied from a separate source. The bandwidth allocation techniques however could be employed directly as described above.

I claim:

1. Apparatus for dynamically allocating portions of available overall channel bandwidth comprising:
   a set including a plurality of individual video coders each of which is processing in parallel at least a different portion of at least one video signal comprised of frames wherein each frame contains an at least one image representation;
   means for receiving as an input from each member of said set of individual video coders an average frame quantization step size employed in a previous frame; and
   means responsive to said average frame quantization step size from each of said individual video coders for generating for a current frame a set of estimated channel sharing factors.

2. The apparatus as defined in claim 1 wherein at least one member of said set of estimated channel sharing factors is generated for each member of said set of individual video coders.

3. The apparatus as defined in claim 1 further includes means for normalizing said set of estimated channel sharing factors.

4. The apparatus as defined in claim 1 further including means for supplying as an output a set of channel sharing factors.

5. The apparatus as defined in claim 4 wherein at least one channel sharing factor of said set of channel sharing factors is supplied to each member of said set of individual video coders.

6. The apparatus as defined in claim 4 wherein said set of channel sharing factors supplied as output is comprised of at least one member of said set of estimated channel sharing factors.

7. The apparatus as defined in claim 4 wherein said set of channel sharing factors supplied as output is comprised of at least one member of a set of modified estimated channel sharing factors.

8. The apparatus as defined in claim 4 wherein said set of channel sharing factors supplied as output is comprised of at least one member of a set of normalized estimated channel sharing factors.

9. The apparatus as defined in claim 4 wherein said set of channel sharing factors supplied as output is comprised of at least one member of a set of normalized modified estimated channel sharing factors.

10. Apparatus for dynamically allocating portions of available overall channel bandwidth comprising:
    a set including a plurality of individual video coders each of which is processing in parallel at least a different portion of at least one video signal comprised of frames wherein each frame contains an at least one image representation;
    means for receiving as an input from each member of said set of individual video coders an average frame quantization step size employed in a previous frame;
    means for receiving as an input a set of values representative of an average number of bits produced per pel by each individual video coder for said previous frame, each member of said set corresponding to at least one member of said set of individual video coders; and
    means responsive to said average frame quantization step size from each of said individual video coders and to said set of values for generating for a current frame a set of estimated channel sharing factors.

11. Apparatus for dynamically allocating portions of available overall channel bandwidth comprising:
a set including a plurality of individual video coders each of which is processing in parallel at least a different portion of at least one video signal comprised of frames wherein each frame contains an at least one image representation;
means for receiving as an input from each member of said set of individual video coders an average frame quantization step size employed in a previous frame;
means responsive to said average frame quantization step size from each of said individual video coders for generating for a current frame a set of estimated channel sharing factors; and
means for deriving a modified set of estimated channel sharing factors from said set of estimated channel sharing factors such that said modified set of estimated channel sharing factors reflects values of at least one estimated channel sharing factor for at least one frame prior to said current frame.

12. The apparatus as defined in claim 11 wherein said means for deriving further includes means for obtaining a weighted average of an at least one of said current estimated channel sharing factors and said at least one estimated channel sharing factor for at least one frame prior to said current frame.

13. The appartus as defined in claim 11 further includes means for normalizing said modified set of estimated channel sharing factors.

14. A method for dynamically allocating portions of available overall channel bandwidth to each member of a set including a plurality of individual video coders wherein each coder is processing in parallel at least a different portion of at least one video signal comprised of frames wherein each frame contains an at least one image representation, comprising the steps of:
receiving as an input from each member of said set of individual video coders an average frame quantization step size employed in a previous frame; and
generating for a current frame a set of estimated channel sharing factors in response to said average frame quantization step size from each of said individual video coders.

15. The method as defined in claim 14 further including the step of normalizing said set of estimated channel sharing factors.

16. The method as defined in claim 14 further including the step of supplying as an output a set of channel sharing factors.

17. A method for dynamically allocating portions of available overall channel bandwidth to each member of a set including a plurality of individual video coders wherein each coder is processing in parallel at least a different portion of at least one video signal comprised of frames wherein each frame contains an at least one image representation, comprising the steps of:
receiving as an input from each member of said set of individual video coders an average frame quantization step size employed in a previous frame;
generating for a current frame a set of estimated channel sharing factors in response to said average frame quantization step size from each of said individual video coders; and
receiving as an input a set of values representative of an average number of bits produced per pel by each individual video coder for said previous frame, each member of said set corresponding to at least one member of said set of individual video coders wherein said step of generating is also responsive to said set of values.

18. A method for dynamically allocating portions of available overall channel bandwidth to each member of a set including a plurality of individual video coders wherein each coder is processing in parallel at least a different portion of at least one video signal comprised of frames wherein each frame contains an at least one image representation, comprising the steps of:
receiving as an input from each member of said set of individual video coders an average frame quantization step size employed in a previous frame; and
generating for a current frame a set of estimated channel sharing factors in response to said average frame quantization step size from each of said individual video coders; and
deriving a modified set of estimated channel sharing factors from said set of estimated channel sharing factors such that said modified set of estimated channel sharing factors reflects values of at least one estimated channel sharing factor for at least one frame prior to said current frame.

19. The method as defined in claim 18 further including the step of normalizing said modified set of estimated channel sharing factors.

* * * * *